United States Patent
Choi

(10) Patent No.: US 7,215,400 B2
(45) Date of Patent: May 8, 2007

(54) IN PLANE SWITCHING MODE LIQUID CRYSTAL DISPLAY DEVICE AND METHOD OF FABRICATING THE SAME

(75) Inventor: Su Seok Choi, Kyounggi-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 298 days.

(21) Appl. No.: 10/963,547

(22) Filed: Oct. 14, 2004

(65) Prior Publication Data

US 2005/0140898 A1    Jun. 30, 2005

(30) Foreign Application Priority Data

Dec. 29, 2003    (KR) .................. 10-2003-0099337

(51) Int. Cl.
G02F 1/1343 (2006.01)
C09K 19/02 (2006.01)

(52) U.S. Cl. .................. 349/141; 349/171; 349/172

(58) Field of Classification Search ............. 349/141, 349/171, 172
See application file for complete search history.

(56) References Cited

U.S. PATENT DOCUMENTS 6,344,889 B1 * 2/2002 Hasegawa et al. .......... 349/129
6,417,907 B2 * 7/2002 Choi et al. .................. 349/141
7,057,700 B2 * 6/2006 Sugimoto et al. ........... 349/172
2005/0213019 A1 * 9/2005 Choi et al. .................. 349/172

OTHER PUBLICATIONS

L. Komitov, et al. *Fast Switching By Electrically Commandad Surfaces (ECS)*, Conference Summaries of the 7th International Conference on Ferroelectric Liquid Crystals (FLC 99), Aug. 29-Sep. 3, 1999, pp. 26-27.

* cited by examiner

Primary Examiner—Mike Qi
(74) Attorney, Agent, or Firm—McKenna Long & Aldridge LLP

(57) ABSTRACT

An in-plane switching mode liquid crystal display device includes a first substrate, a second substrate, ferroelectric liquid crystal layers between the first and second substrates disposed substantially at respective surfaces of the first and second substrates, the ferroelectric liquid crystal layers arranged by an exposure to one of an amphiphobic medium and an amphiphilic medium, a nematic liquid crystal layer between the ferroelectric liquid crystal layer of the first substrate and the ferroelectric liquid crystal layer of the second substrate, and electrodes disposed on surfaces of each of the first and second substrates to vertically apply an electric field to the ferroelectric liquid crystal layers and to the nematic liquid crystal layer.

26 Claims, 18 Drawing Sheets

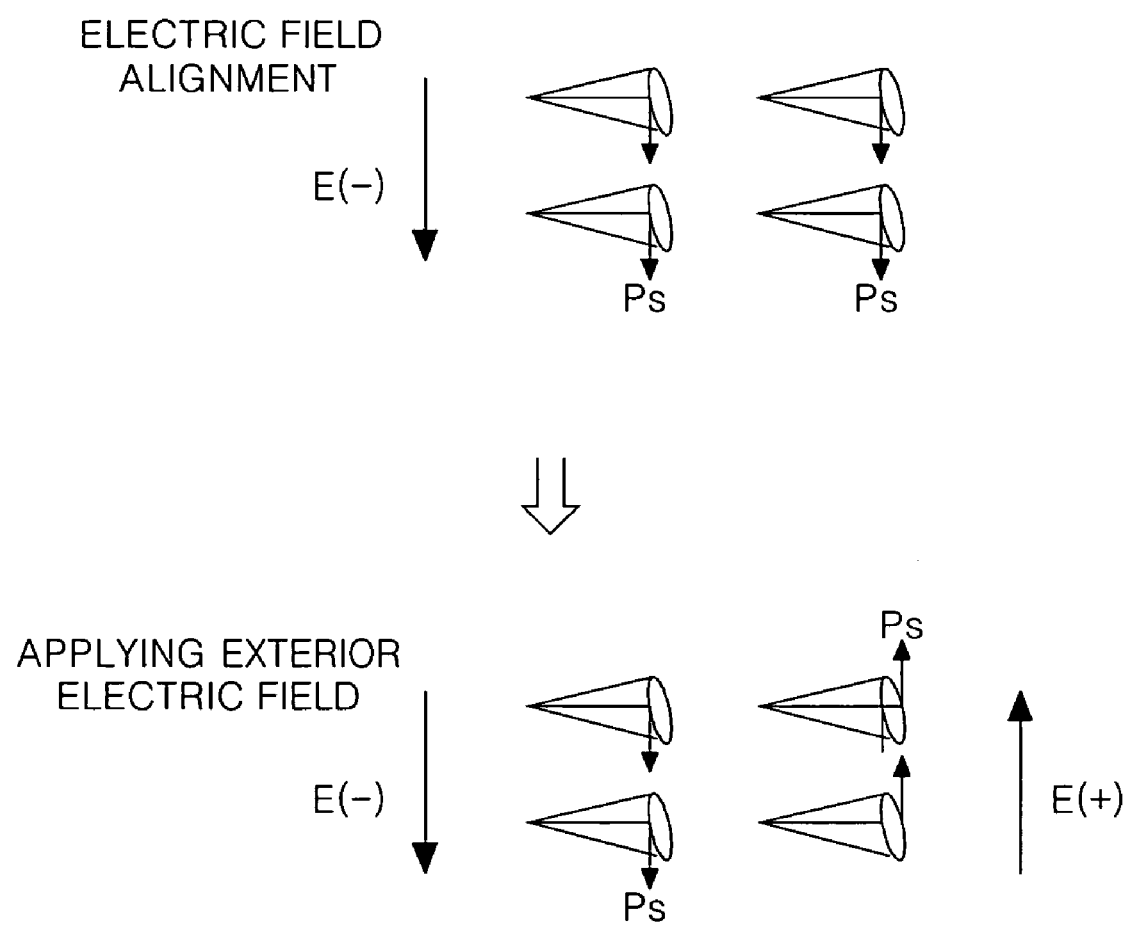

FIG.10
AMPHIPHOBIC MEDIUM
34                                                                         40
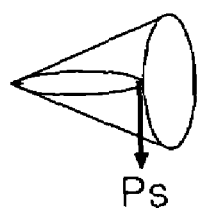 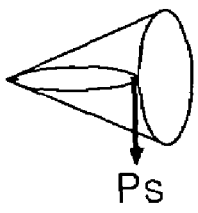 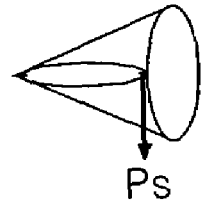 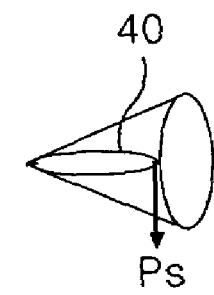
Ps        Ps        Ps        Ps
AMPHIPHILIC MEDIUM
33

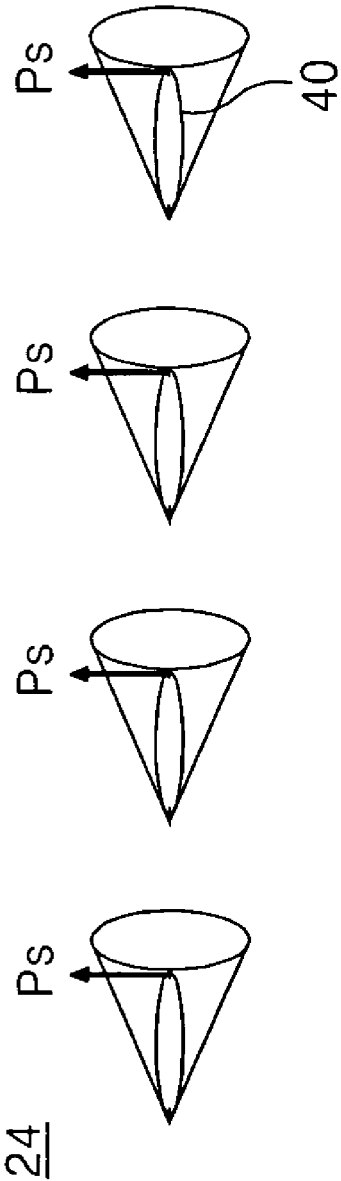

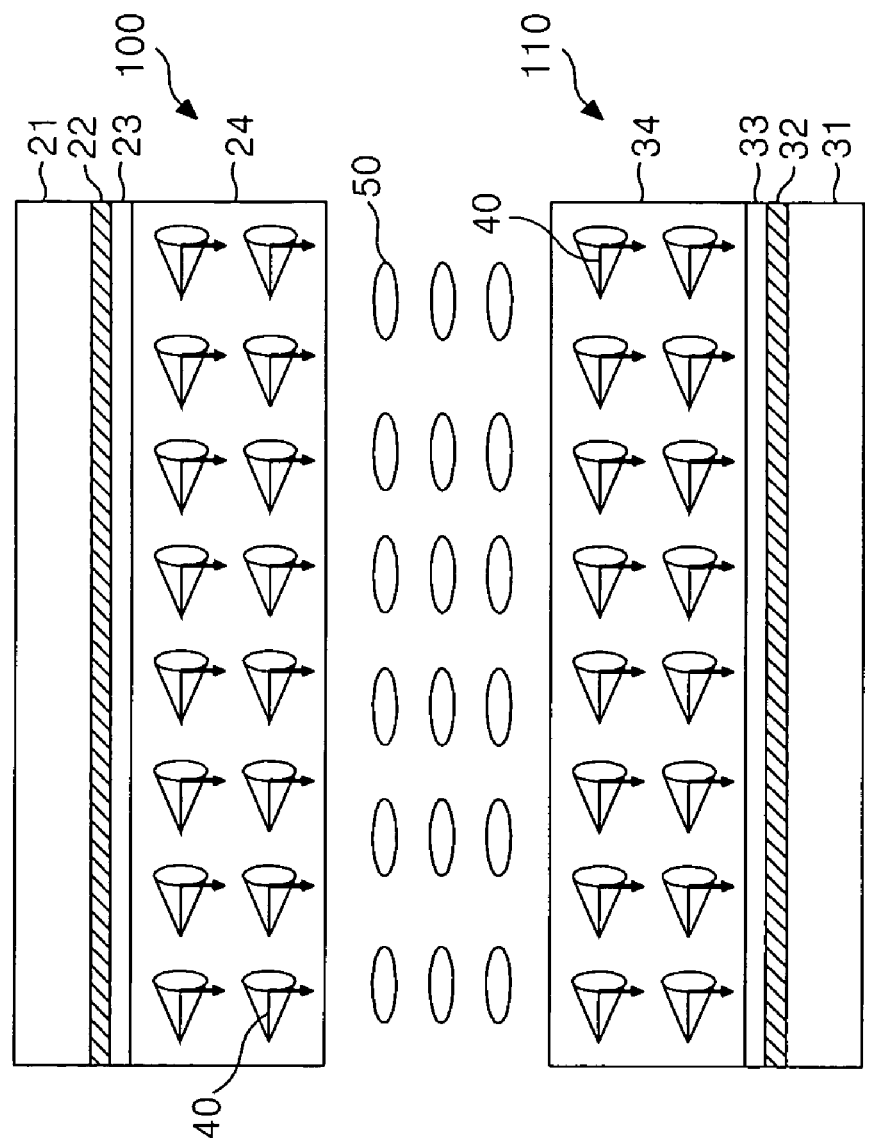

IN PLANE SWITCHING MODE LIQUID CRYSTAL DISPLAY DEVICE AND METHOD OF FABRICATING THE SAME

This application claims the benefit of Korean Patent Application No. P2003-99337 filed in Korea on Dec. 29, 2003, which is hereby incorporated by reference.

BACKGROUND OF THE INVENTION

1. Field of the Invention

The present invention relates to a liquid crystal display device, more particularly, to an in plane switching mode liquid crystal display device having ferroelectric liquid crystal material and a method of fabricating the same.

2. Description of the Related Art

A liquid crystal display (LCD) device controls an electric field applied to a liquid crystal cell. The controlling of the electric field modulates light incident to the liquid crystal cell, thereby displaying a picture. A liquid crystal material injected into the liquid crystal display device is in a middle state of a solid and a liquid having both fluidity and elasticity together.

A twisted nematic (TN) mode uses a vertical electric field scheme and is the liquid crystal mode most commonly used in liquid crystal display devices until recently. The TN mode has the advantage of having a relatively high aperture ratio. On the other hand, the TN mode has a disadvantage of not having a wide viewing angle because of the refractive index of the liquid crystal material. Further, the response speed of the liquid crystal material using TN mode is slow.

An in-plane switching (IPS) mode uses an electric field that is parallel to the display panel of the liquid crystal display device. In the IPS mode, an electric field is formed between electrodes formed on a substrate, and liquid crystal molecules are driven by the horizontal electric field. FIG. 1 is a cross-sectional view schematically illustrating schematically an in-plane switching mode liquid crystal display device according to the related art. In the IPS mode, as shown in FIG. 1, a pixel electrode 16 and a common electrode 15 are formed on a lower glass substrate 18, and an electric field 20 is formed in a horizontal direction by a voltage difference applied between the electrodes 15 and 16. Liquid crystal molecules 14 are rotated on a surface of the substrate by the electric field 20 to modulate a polarization component of light transmitting a liquid crystal layer. In FIG. 1, polarizers 11 and 19 are respectively attached to an upper glass substrate 12 and the lower glass substrate 18 such that the axes of the polarizers cross each other. The alignment films 13 and 17 are respectively formed on the upper glass substrate 12 and the lower glass substrate 18. If the polarization component of the light transmitting through the liquid crystal layer is changed by 90 degrees, then the light passes through the upper polarizer 11. On the other hand, if the polarization component of the light does not change, then the light cannot pass thorough the upper polarizer 11.

The IPS mode liquid crystal display device shown in FIG. 1 has an advantage in that it has a wide viewing angle since a refractive index change of the liquid crystal material is not large. However, in the IPS mode liquid crystal display device, the electric field applied to the liquid crystal molecules is done with opaque electrodes 15 and 16 on the lower substrate. As a result, it has the disadvantage of having a low aperture ratio.

A ferroelectric liquid crystal (FLC) has the advantage having a high response speed and a wide viewing angle. The ferroelectric liquid crystal has a structure the uses both electrical and magnetic properties. A ferroelectric liquid crystal can be driven within plane that rotates along a virtual cone in response to electric field. The ferroelectric liquid crystal has a permanent polarization, in other words, a spontaneous polarization without having an external electric field. Like an interaction between two magnets. If an external electric field is applied, the ferroelectric liquid crystal rotates rapidly with an interaction between the external field and the spontaneous polarization. The response speed of the ferroelectric liquid crystal is several hundred or thousand times as fast as that of other mode liquid crystal. Further, since the ferroelectric liquid crystal has an in-plane-switching property in itself, it has a wide viewing angle without having a special electrode structure or a compensation film. Ferroelectric liquid crystal is classified into a V-switching mode and a half V-switching mode according to a characteristic reacting in response to a polarity of an electric field.

In the ferroelectric liquid crystal cell of the V-switching mode, as temperature is lowered, a thermodynamic phase transition arises like an isotropic→a smectic A phase (SA)→a chiral smectic X phase (Sm X*)→a crystal. Isotropic is a state where the liquid crystal molecules do not have direction and location order. Smectic A phase is a state where the liquid crystal molecules are divided into a virtual layer and arranged vertically on the virtual layer, and has a symmetry about up and down. The chiral smectic X phase is a middle state between the smectic A phase and the crystal phase. FIG. 2 is a graph illustrating a voltage vs. a transmittance property of a ferroelectric liquid crystal of a V-switching mode according to the related art. The ferroelectric liquid crystal cell of the V-switching mode in which the liquid crystal molecule is phase-transited to the chiral smectic X phase, as shown in FIG. 2, improves a light transmittance of an incidence light by changing the arrangement state of the liquid crystal molecules in response to the external voltage of positive polarity +V and the external voltage of negative polarity −V.

The V-switching mode has the advantages of high-speed-response and wide viewing angle. However, the V-switching mode has the disadvantages of requiring high power for driving a liquid crystal cell to overcome a large spontaneous polarization value and a large storage capacitor to store enough charge for maintaining a data voltage. Accordingly, if the V-switching mode is used in a liquid crystal display device, power consumption of the liquid crystal display device is high, and an aperture ratio is reduced because of a large electrode area for a capacitor.

In contrast, the half V-switching mode has the advantages of high-speed-response, wide viewing angle, and further, it is well suited for displaying moving picture and representing liquid crystal display device because the capacitance is low comparatively. FIG. 3 is a diagram illustrating a phase transition process of the ferroelectric liquid crystal of a half V-switching mode according to the related art. As shown in FIG. 3, the phase transition from the isotropic to the chiral nematic phase (N*) occurs below the transition temperature (Tni), the phase transition from the chiral nematic phase (N*) to the chiral smectic C phase (Sm C*) occurs below the transition temperature (Tsn), and the phase transition from the chiral smectic C phase to the crystal occurs as the temperature is lowered below the transition temperature (Tcs) causing. The thermodynamic phase transitions that can be attained are isotropic→the chiral nematic (N*)→the chiral smectic C phase (Sm C*)→the crystal.

FIG. 4 is a diagram illustrating a change of molecule arrangement depending on whether or not an alignment under an electric field is applied to the ferroelectric liquid crystal of the half V-switching mode according to the related art. A method of manufacturing the liquid crystal cell of a half V-switching mode will be described as follows with reference to FIG. 4. The ferroelectric liquid crystal is injected into the cells arranged in parallel at an incipient temperature of the isotropic phase that does not have direction and location order. If the temperature of the isotropic is lowered to a designated temperature, the ferroelectric liquid crystal becomes chiral nematic phase (N*) arranged in parallel with respect to the rubbing direction. In the chiral nematic phase (N*), if the temperature is gradually reduced and a sufficient electric field is applied to the inside of the liquid crystal cell, then the ferroelectric liquid crystal of the chiral nematic phase (N*) transits to the chiral smectic phase (SmC*) and the spontaneous polarization direction of the ferroelectric liquid crystal is arranged coincidentally with a direction of an electric field formed inside the cell. As a result, the spontaneous polarization direction of the ferroelectric liquid crystal coincides with the direction of electric field applied upon electric field alignment among two arrangement directions of the molecules depending on the alignment process of an upper plate and a lower plate when the parallel alignment is disposed, and the ferroelectric liquid crystal has a uniform alignment condition entirely by virtue of the electric field alignment, as shown in FIG. 4.

FIGS. 5A and 5B are graphs illustrating the changes of light transmittance according to the voltage in the ferroelectric liquid crystal cell of the half V-switching mode, respectively. Referring to FIG. 5A, in case of the liquid crystals being aligned under electric field by a negative polarity voltage −V, the ferroelectric liquid crystal cell of the half V-switching mode makes incident light transmit by changing the polarization direction of the incident light 90° only when a positive voltage +V is applied thereto, and makes most of the incident light cut-off by maintaining the polarization direction of the incident light when the negative voltage −V is applied thereto. The ratio of the light transmittance increases in proportion to the positive electric field intensity and maintains the maximum value if the positive electric field intensity increases to more than the designated threshold value. In contrast, if the ferroelectric liquid crystal of the half V-switching mode cell is aligned under electric field by the positive polarity voltage +V, the ferroelectric liquid crystal cell of the half V-switching mode, as illustrated in FIG. 5B, makes the incident light transmit only when the negative voltage −V is applied thereto and makes most of the incident light cut-off when the positive voltage +V is applied.

FIG. 6 represents a change of the ferroelectric liquid crystal arrangement when applying the alignment electric field of a negative polarity E(−) to the ferroelectric liquid crystal cell of the half V-switching mode, and a change of the ferroelectric liquid crystal arrangement when respective external electric fields E(+) and E(−) of a positive polarity and a negative polarity are applied thereto. Referring to FIG. 6, if the ferroelectric liquid crystal cell of the half V-switching mode is aligned under the external electric field of the negative polarity E(−), then the spontaneous polarization direction Ps of the ferroelectric liquid crystal is aligned uniformly in a direction coinciding with the external electric field of the negative polarity (E−).

After the electric field is aligned as described above, if the external electric field of the positive polarity (E(+)) is applied to the ferroelectric liquid crystal cell of the half V-switching mode, an arrangement of the liquid crystal molecules is changed and a direction of spontaneous polarization Ps coincides with the external electric field of the positive polarity E(+). The polarization direction of the light incident to the liquid crystal layer via a lower plate polarizer is changed to the polarization direction of an upper plate polarizer by the liquid crystal molecules in which the arrangement is changed and the incident light transmits through the polarizer installed in the upper plate. If the external electric field of the negative polarity E(−) is applied or the external electric field is not applied to the ferroelectric liquid crystal cell of the half V-switching mode, then the arrangement of the liquid crystal molecules maintains an incipient arrangement state as it is and the incident light maintains the polarization direction. Thus, the incident light cannot pass through the polarizer in the upper plate.

FIG. 7 is a configuration illustrating two sub-regions existing in one liquid crystal cell in a case that an alignment under an electric field is not performed according to the related art. Without performing the electric field alignment process, the two states of molecule arrangements of which the layers are randomly vent appear while phase-transiting from the chiral nematic phase (N*) to the chiral smectic C phase (SmC*). If a random bi-stable state in which the molecule arrangement of the ferroelectric liquid crystal is random becomes, then it is difficult to uniformly control the ferroelectric liquid crystal. If the two states of molecule arrangements of which the layers are different from each other randomly exist in one ferroelectric liquid crystal cell, then the liquid crystal cell, in response to the electric field having polarities different from each other, becomes divided into two regions that are separately driven. More specifically, as shown in FIG. 7, if two molecule arrangements exist with the layers are randomly bent in the same ferroelectric liquid crystal cell, then the direction of the spontaneous polarization Ps of ferroelectric liquid crystal molecule becomes different in the two regions.

FIG. 8 is a configuration illustrating a liquid crystal molecule reacting by an exterior electric field in two sub-regions shown in FIG. 7 according to the related art. In FIG. 7, it is assumed that a symbol ⊙ represents a spontaneous polarization direction of the ferroelectric liquid crystal molecule identical to an electric field direction of a positive polarity and a symbol ⊗ represents a spontaneous polarization direction of the ferroelectric liquid crystal molecule identical to an electric field direction of a negative polarity. If the electric field of the negative polarity is applied to the ferroelectric liquid crystal cell including two molecule arrangements of which the layers, having the direction of the spontaneous polarization Ps different from each other, are different from each other, then the liquid crystal molecules having the direction of the spontaneous polarization Ps in running parallel to the electric field direction ⊗ of the negative polarity included in a molecular arrangement, as in the right region of FIG. 7, does not react to the electric field of the negative polarity and maintains the spontaneous polarization direction as it is. In contrast, the liquid crystal molecules included in a molecular arrangement, as in a left region in FIG. 7, reacts to the electric field of the negative polarity to rotate along the virtual cone, and, at the same time, the direction of the spontaneous polarization Ps is changed in the ⊗ direction in running parallel to the electric field of the negative polarity, as shown in FIG. 8. At this time, while an incident light passes through the left region of FIG. 7, the polarization direction is changed forward in a direction of a light outgoing side (that is, a polarization direction of the polarizer in the upper plate) to pass through the polarizer in the upper plate. In contrast, an incident light entered to the right region of in FIG. 7 maintains its polarization direction to enter the polarizer in the upper plate, whereby the incident light cannot transmit the polarizer in the upper plate.

Accordingly, the two regions exist with the layers are vent randomly and the direction of the spontaneous polarization Ps is different in the two regions in one ferroelectric liquid crystal cell, then it is impossible to accurately control the half V-switching mode. Further, as shown in FIG. 7, if there are exist the two regions different from each other in the same ferroelectric liquid crystal cell, then a brightness difference can be appeared every frame period because the liquid crystal molecules react to the electric fields having polarities different from each other depending on the respective regions.

SUMMARY OF THE INVENTION

Accordingly, the present invention is directed to an in-plane-switching mode liquid crystal display device of and a method of fabricating the same that substantially obviates one or more of the problems due to limitations and disadvantages of the related art.

An object of the present invention to provide a liquid crystal display device of in-plane switching mode and a method of fabricating the same capable of aligning a ferroelectric liquid crystal and representing a wide viewing angle without requiring an exterior electric field.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes a first substrate, a second substrate, ferroelectric liquid crystal layers between the first and second substrates disposed substantially at respective surfaces of the first and second substrates, the ferroelectric liquid crystal layers arranged by an exposure to one of an amphiphobic medium and an amphiphilic medium, a nematic liquid crystal layer between the ferroelectric liquid crystal layer of the first substrate and the ferroelectric liquid crystal layer of the second substrate, and electrodes disposed on surfaces of each of the first and second substrates to vertically apply an electric field to the ferroelectric liquid crystal layers and to the nematic liquid crystal layer.

In another aspect of the present invention, a method of fabricating an in-plane switching mode liquid crystal display device includes forming an electrode on each of first and second substrates, forming ferroelectric liquid crystal layers at respective surfaces of the first and second substrates, deriving a phase transition of the ferroelectric liquid crystal layers in a state exposed to one of an amphiphilic medium and an amphiphobic medium to stabilize the ferroelectric liquid crystal layers, and forming a nematic liquid crystal layer between the ferroelectric liquid crystal layer of the first substrate and the ferroelectric liquid crystal layer of the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram illustrating the ferroelectric liquid crystal of the half V-switching mode reacting to an electric field upon aligning under an electric field and to an electric field applied upon driving according to the related art.

FIG. 10 is a configuration schematically illustrating a ferroelectric liquid crystal being stabilized into a monostable state in the phase transition process of FIGS. 9C and 9D.

FIG. 12 is a configuration schematically illustrating a ferroelectric liquid crystal being stabilized to a mono-stable state in the phase transition process of FIGS. 11C and 11D.

FIG. 13 is a cross-sectional view illustrating a liquid crystal display device of an in-plane switching mode according to an exemplary embodiment of the present invention.

DETAILED DESCRIPTION OF THE PREFERRED EMBODIMENTS

Reference will now be made in detail to the preferred embodiments of the present invention, examples of which are illustrated in the accompanying drawing. Hereinafter, the preferred embodiments of the present invention will be described in detail with reference to FIGS. 9 to 16.

Figure 9A:
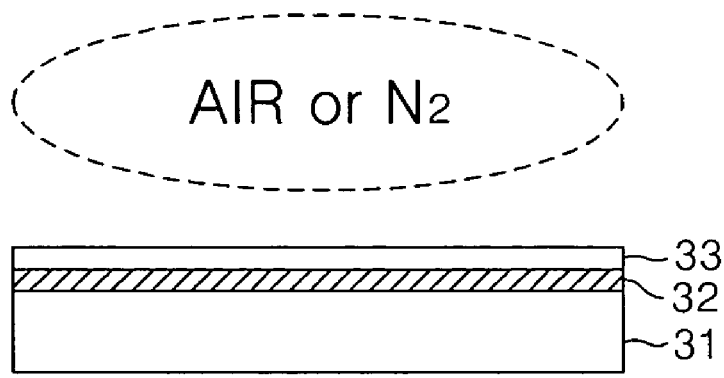
FIGS. 9A to 9D are cross-sectional views sequentially illustrating a method of fabricating a liquid crystal display device of an in-plane switching mode according to an exemplary embodiment of the present invention.
Figure 9B:
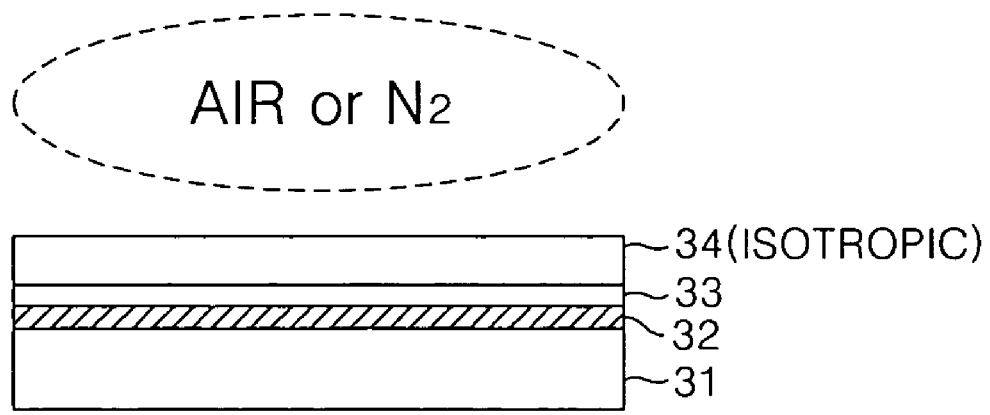

FIGS. 9A to 9D are cross-sectional views sequentially illustrating a method of fabricating a liquid crystal display device of an in-plane switching mode according to an exemplary embodiment of the present invention. First, an electrode 32 and a polarity alignment film 33 are formed on a glass substrate 31, as shown in FIG. 9A. The electrode 32 is formed of a transparent conductive material, such as an indium-tin-oxide (ITO). Since the polarity alignment film 33 has an electric negativity such as a polyamic acid, the polarity alignment film 33 electrically represents a polarity and is formed of an organic alignment material capable of aligning a liquid crystal material. The polarity alignment film 33 is rubbed to determine an alignment direction of ferroelectric liquid crystal molecules.

Subsequently, a mixture in which the ferroelectric liquid crystal and an organic solvent are uniformly mixed is applied to the glass substrate 31 while in a state that the glass substrate 31 is exposed to an amphiphobic medium almost not representing electric polarity, and then the glass substrate 31 is increased up to the temperature between about 140° C. to 160° C. to vaporize the organic solvent. As a result, a ferroelectric liquid crystal layer 34 of an isotropic phase is formed on the glass substrate 31. The amphiphobic medium may be selected from an atmosphere of air or nitrogen $N_2$, for example.

Figure 9C:
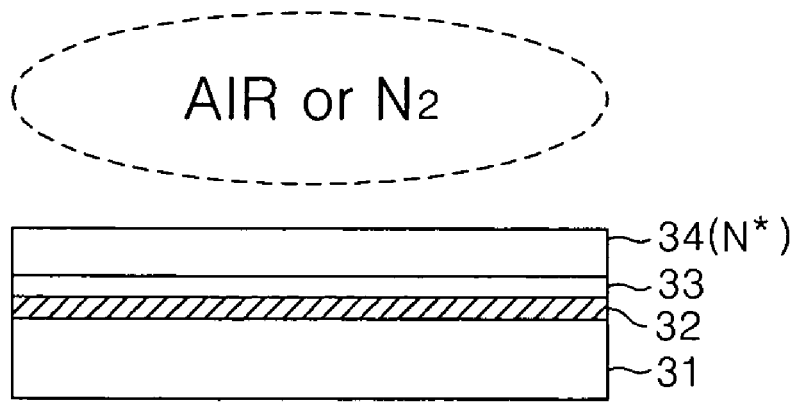
Figure 9D:
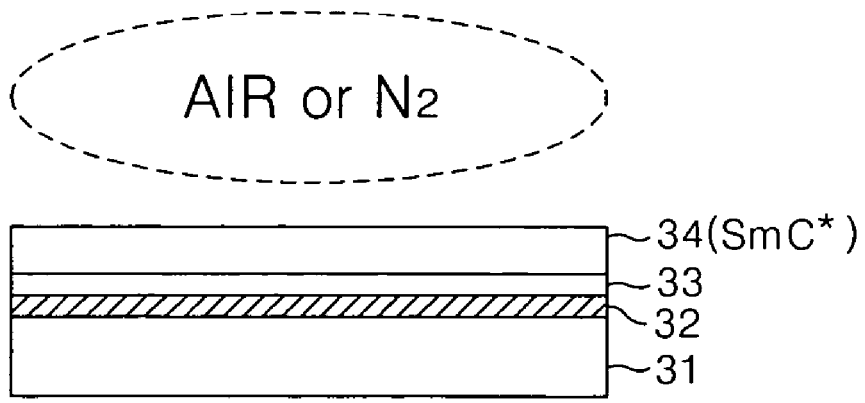

To make a phase transition from the ferroelectric liquid crystal layer 34 to the chiral nematic phase (N*) as shown in FIG. 9C, the temperature of the glass substrate 31 is lowered to the temperature for the phase transition between 110° C. to 85° C. Further, to make a phase transition from the ferroelectric liquid crystal layer 34 to the chiral nematic phase (N*) as shown in FIG. 9C to the chiral smectic C phase (Sm C*) as shown in FIG. 9D, the temperature of the glass substrate 31 is lowered to the temperature for the phase transition between 80° C. to 50° C. At this time, as shown in FIG. 10, a spontaneous polarization Ps is generated in the liquid crystal molecules 40 of the ferroelectric liquid crystal layer 34 during the transition process to the chiral smectic C phase (Sm C*), and the direction of the spontaneous polarization Ps directs to the polarity alignment film 33. In other words, while the liquid crystal molecules 40 of the ferroelectric liquid crystal layer 34 is subjected to the phase transition to the chiral smectic C phase (Sm C*), the direction of the spontaneous polarization Ps is uniformly arranged to a mono-stable state without having an external electric field. Alternatively, the liquid crystal molecules 40 of the ferroelectric liquid crystal layer 34 may go though phase transitions from an isotropic phase to a chiral smectic A phase (Sm A*) and from the chiral smectic A phase (Sm A*) to a chiral smectic C phase (Sm C*). Also, the liquid crystal molecules 40 of the ferroelectric liquid crystal layer 34 may go though phase transitions from an isotropic phase to a chiral smectic C phase (Sm C*).

FIGS. 11A to 11D are sectional views sequentially illustrating a method of fabricating a liquid crystal display device of an in-plane switching mode according to another exemplary embodiment of the present invention.

Figure 11A:
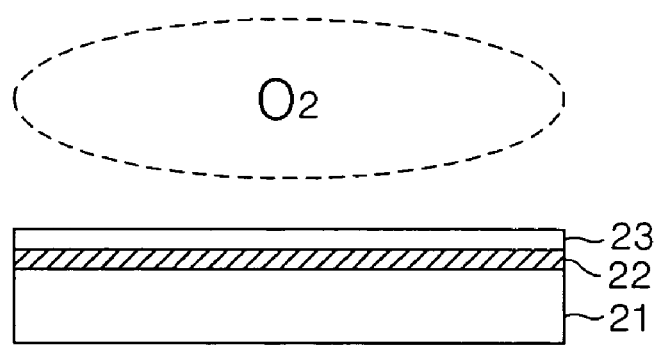
FIGS. 11A to 11D are sectional views sequentially illustrating a method of fabricating a liquid crystal display device of an in-plane switching mode according to another exemplary embodiment of the present invention.

First, an electrode 22 and a polarity alignment film 23 are formed on a glass substrate 21 as shown in FIG. 11A. The electrode 22 is formed of a transparent conductive material such as an indium tin oxide (ITO). The polarity alignment film 23 is formed of an organic alignment material such as a polyamic acid, and the polarity alignment film is rubbed to define an alignment direction of ferroelectric liquid crystal molecules.

Figure 11B:
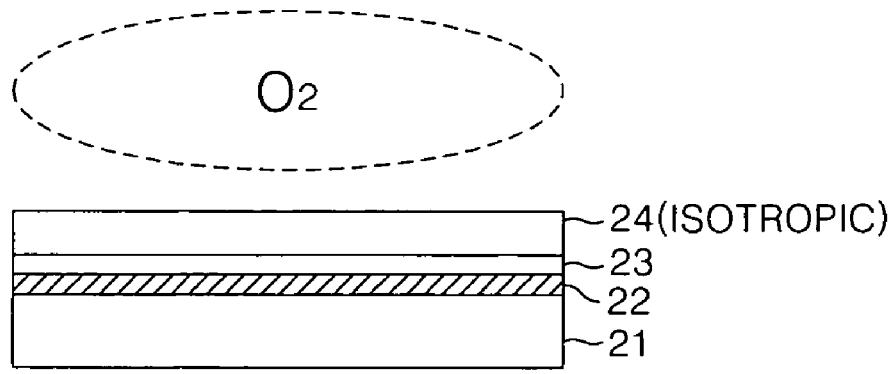

Subsequently, a mixture in which the ferroelectric liquid crystal and an organic solvent are uniformly mixed is applied to the glass substrate 11 with the glass substrate 11 being exposed under an amphiphilic medium, e.g., under an atmosphere of $H_2O$ or $O_2$, having a high electric negativity (i.e., a high polarity) as compared with the alignment film 23 as shown in FIG. 11B, and with the glass substrate 11 being at a temperature of the glass substrate 21 is increased to a temperature between about 140° C. to 160° C. to vaporize the organic solvent. As a result, a ferroelectric liquid crystal layer 24 of an isotropic phase is formed on the glass substrate 21.

Figure 11C:
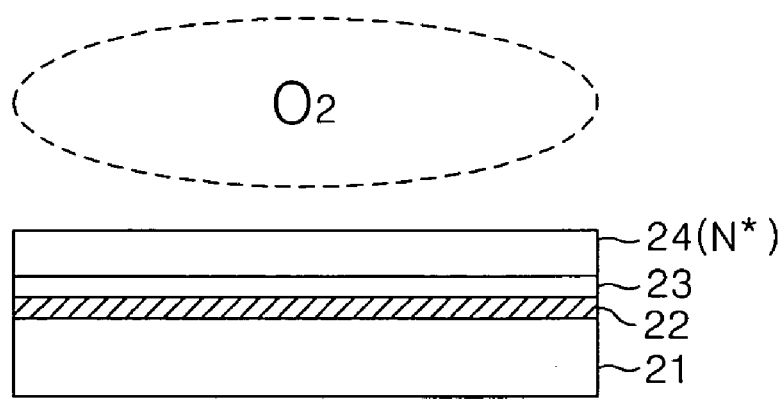
Figure 11D:
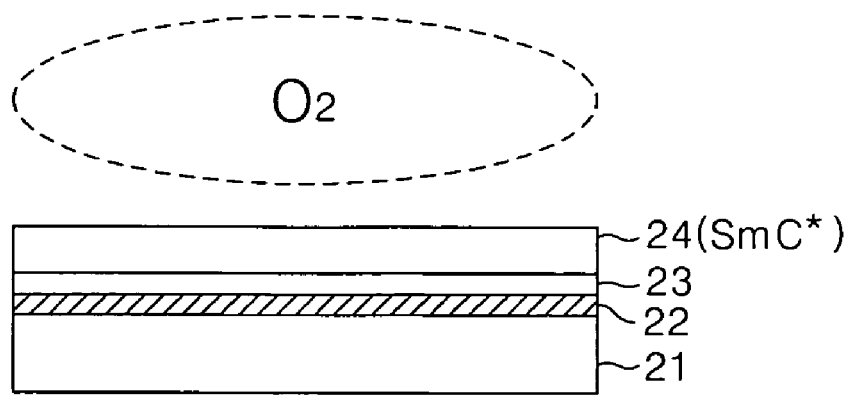
Figure 14:
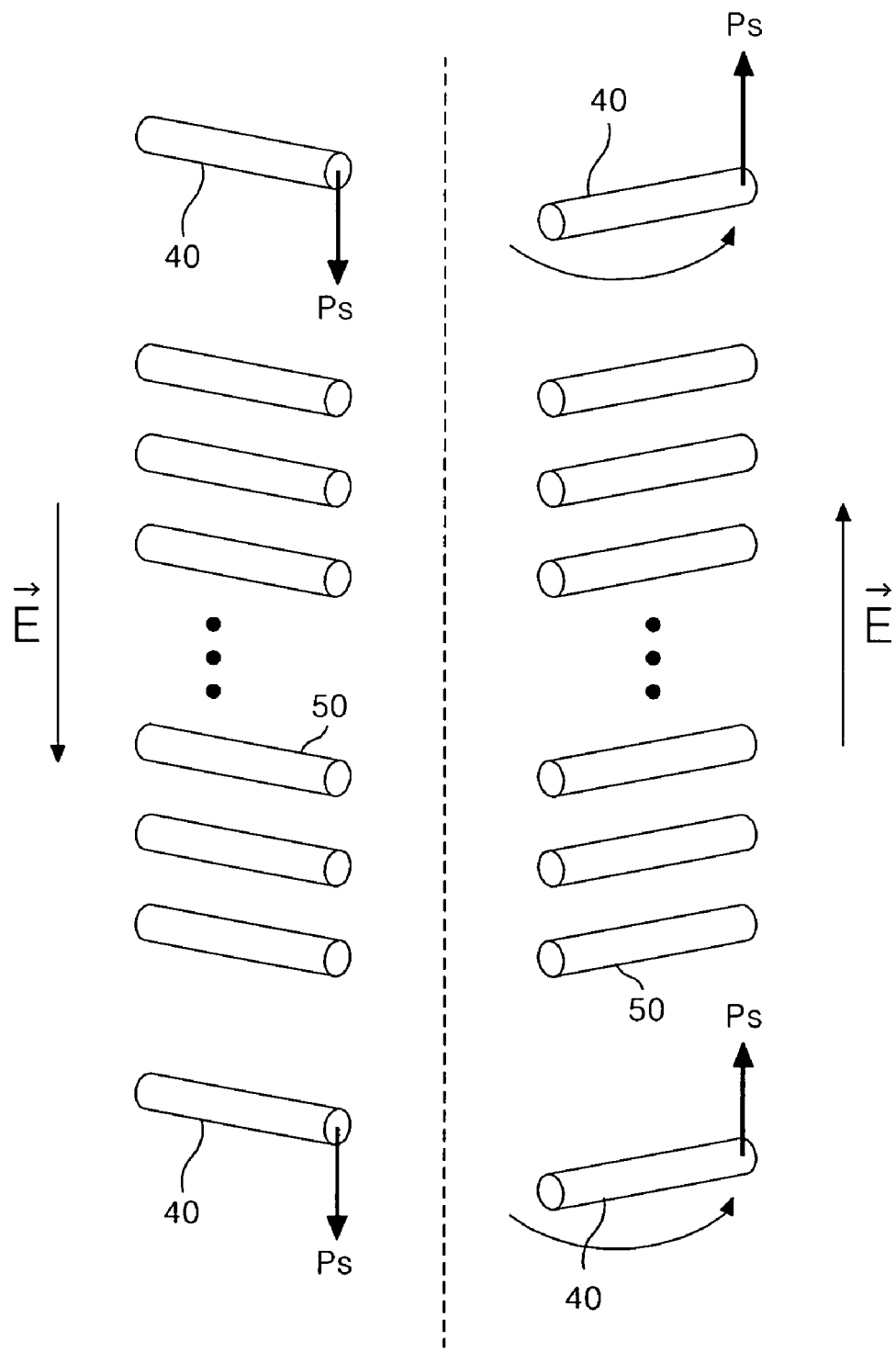
FIG. 14 is a configuration illustrating a movement of the in-plane switching mode of the ferroelectric liquid crystal shown in FIG. 13 and of a nematic system liquid crystal.

In order to make a phase transition from the ferroelectric liquid crystal layer 24 to the chiral nematic phase (N*) as shown in FIG. 11C, the temperature of the glass substrate 21 is lowered to the temperature for the phase transition between about 110° C. to 85° C. Further, to make a phase transition from the ferroelectric liquid crystal layer 24 to the chiral nematic phase (N*) as shown in FIG. 11C to the chiral smectic C phase (Sm C*) as shown in FIG. 11D, the temperature of the glass substrate 21 is lowered to the temperature for the phase transition between about 80° C. to 50° C. At this time, as shown in FIG. 12, a spontaneous polarization Ps is generated in the liquid crystal molecules 40 of the ferroelectric liquid crystal layer 24 during the transition process to the chiral smectic C phase (Sm C*), and the direction of the spontaneous polarization Ps directs toward the polarity medium on the opposite side to the alignment film 23. This is because the polarity medium on the opposite side to the alignment film 23 has a higher electrical negativity as compared with the alignment film 23. In other words, while the liquid crystal molecules 40 of the ferroelectric liquid crystal layer 24 is subject to the phase transition to the chiral smectic C phase (Sm C*), the direction of the spontaneous polarization Ps is uniformly arranged to a mono-stable state without having an external electric field.

Figure 1:
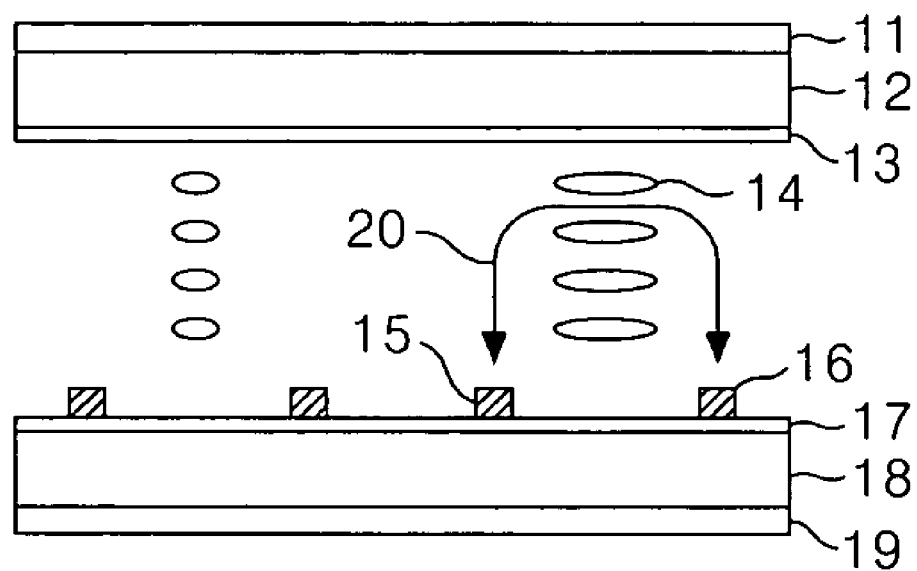
FIG. 1 is a cross-sectional view illustrating schematically an in-plane switching mode liquid crystal display device according to the related art.
Figure 2:
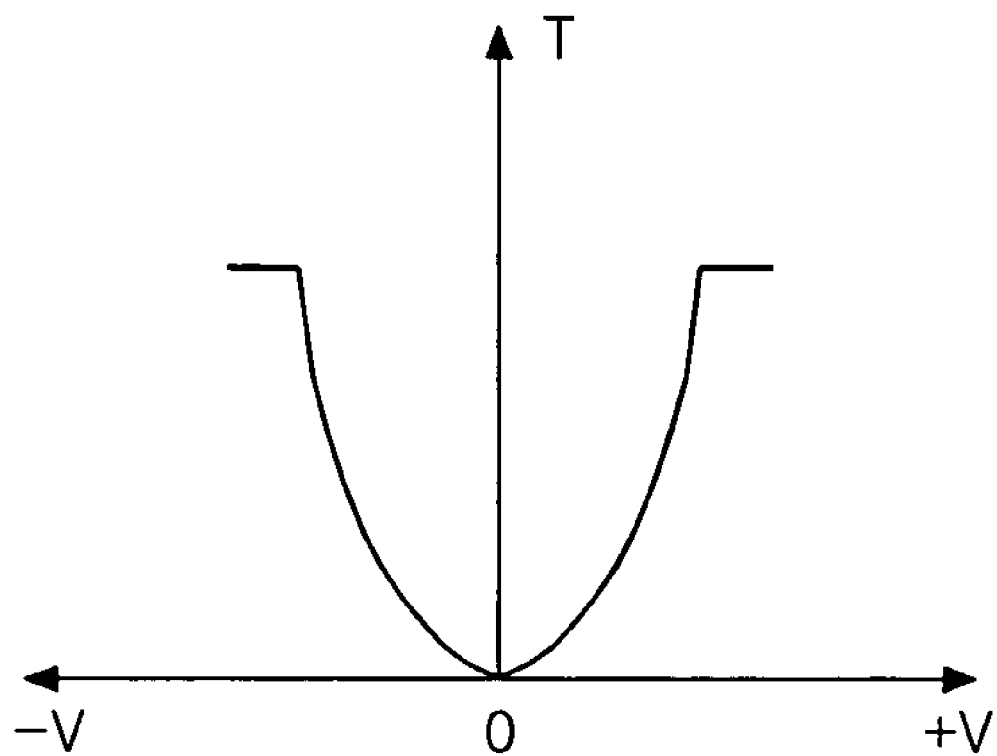
FIG. 2 is a graph illustrating a voltage vs. a transmittance property of a ferroelectric liquid crystal of a V-switching mode according to the related art.
Figure 3:
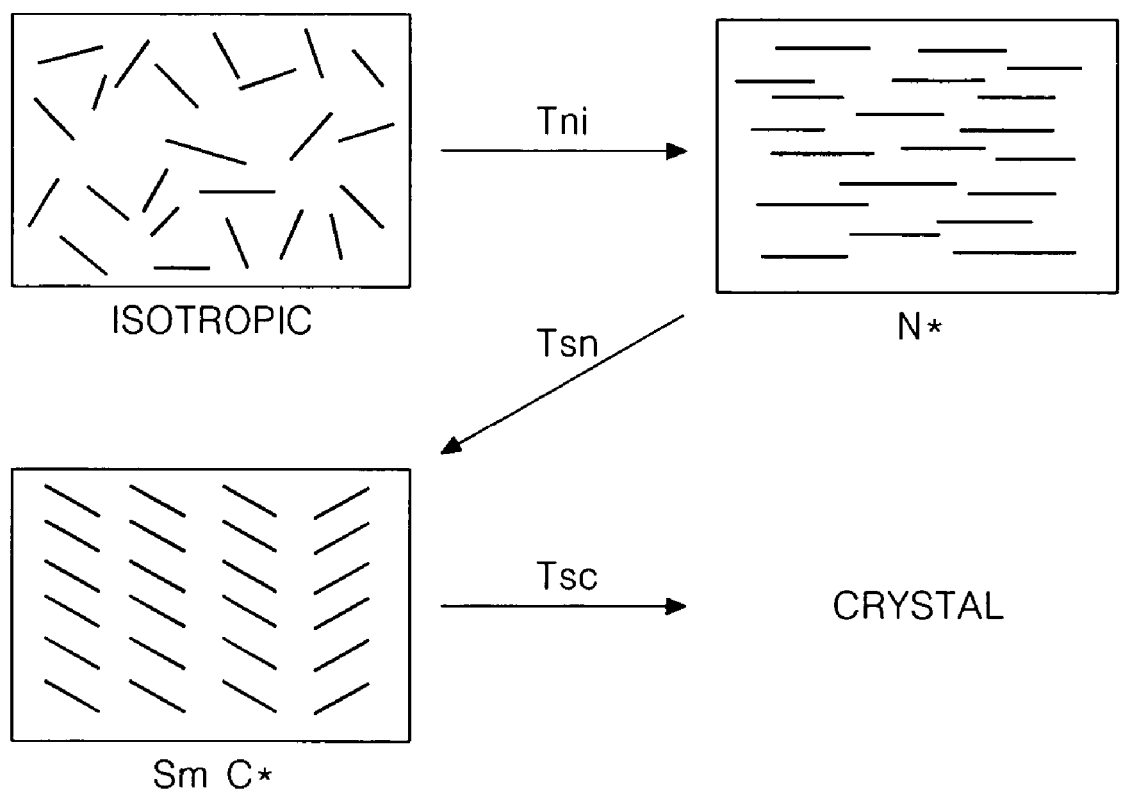
FIG. 3 is a diagram illustrating a phase transition process of the ferroelectric liquid crystal of a half V-switching mode according to the related art.
Figure 4:
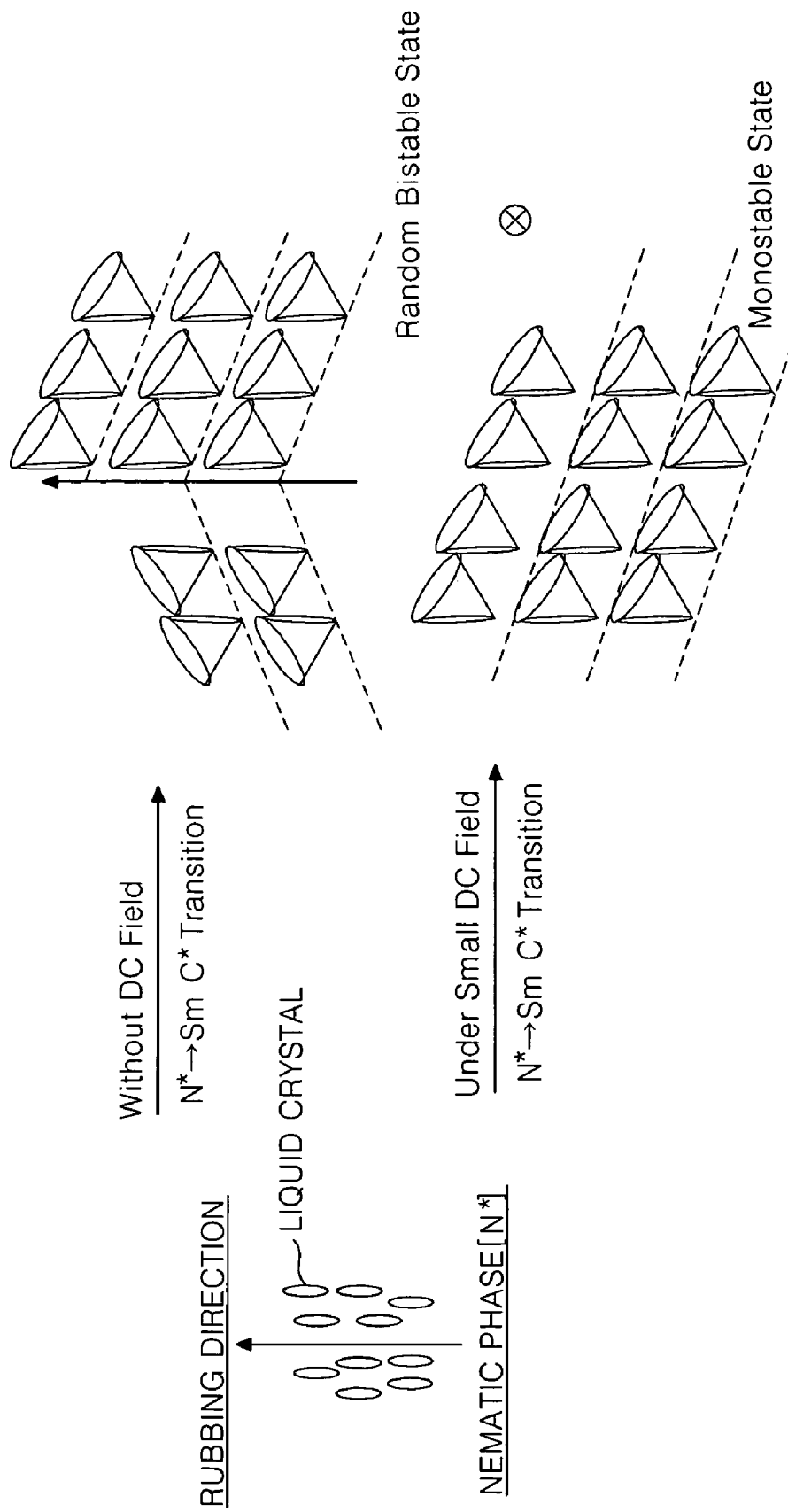
FIG. 4 is a diagram illustrating a change of molecule arrangement depending on whether or not an alignment under an electric field is applied to the ferroelectric liquid crystal of the half V-switching mode according to the related art.
Figure 5A:
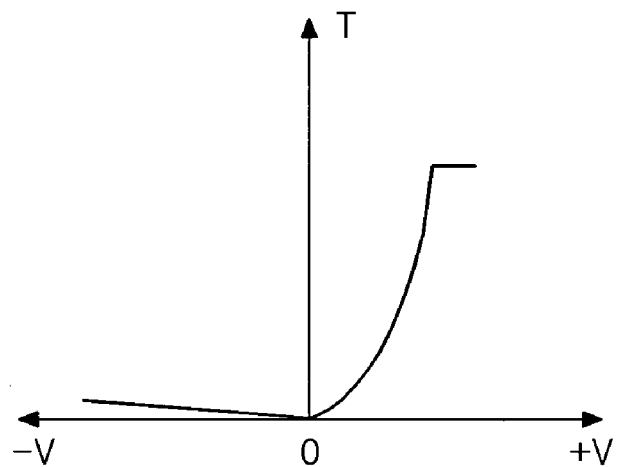
FIGS. 5A and 5B are graphs illustrating a voltage vs. a transmittance property of the half V-switching mode according to the related art.
Figure 5B:
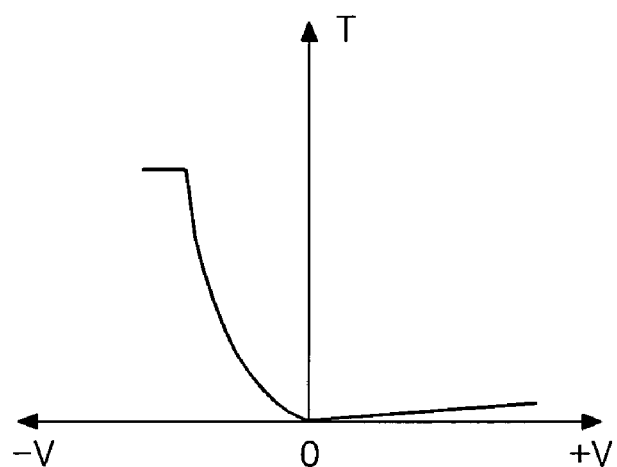
Figure 7:
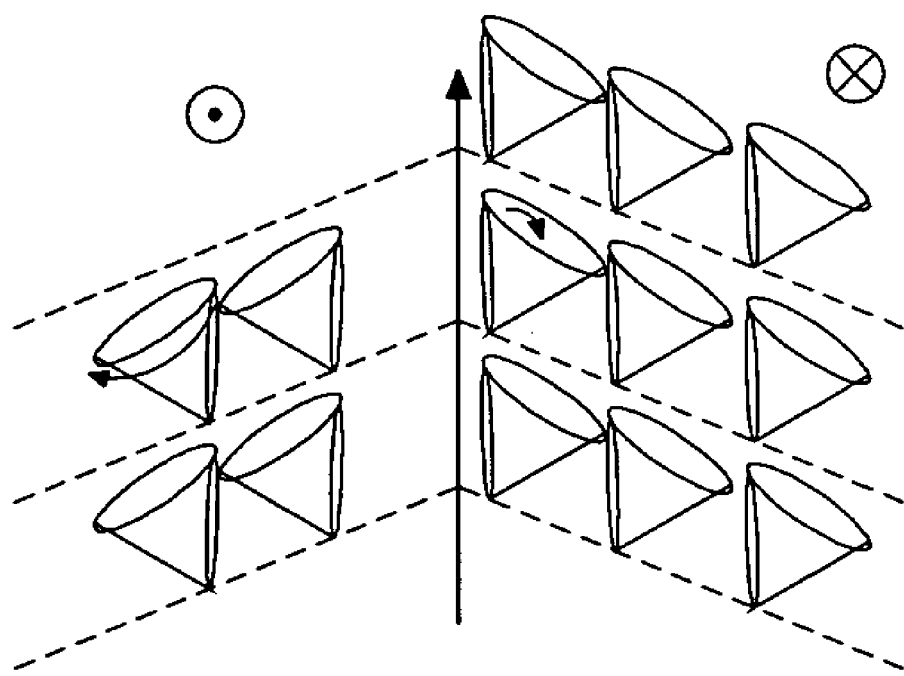
FIG. 7 is a configuration illustrating two sub-regions existing in one liquid crystal cell in a case that an alignment under an electric field is not performed according to the related art.
Figure 8:
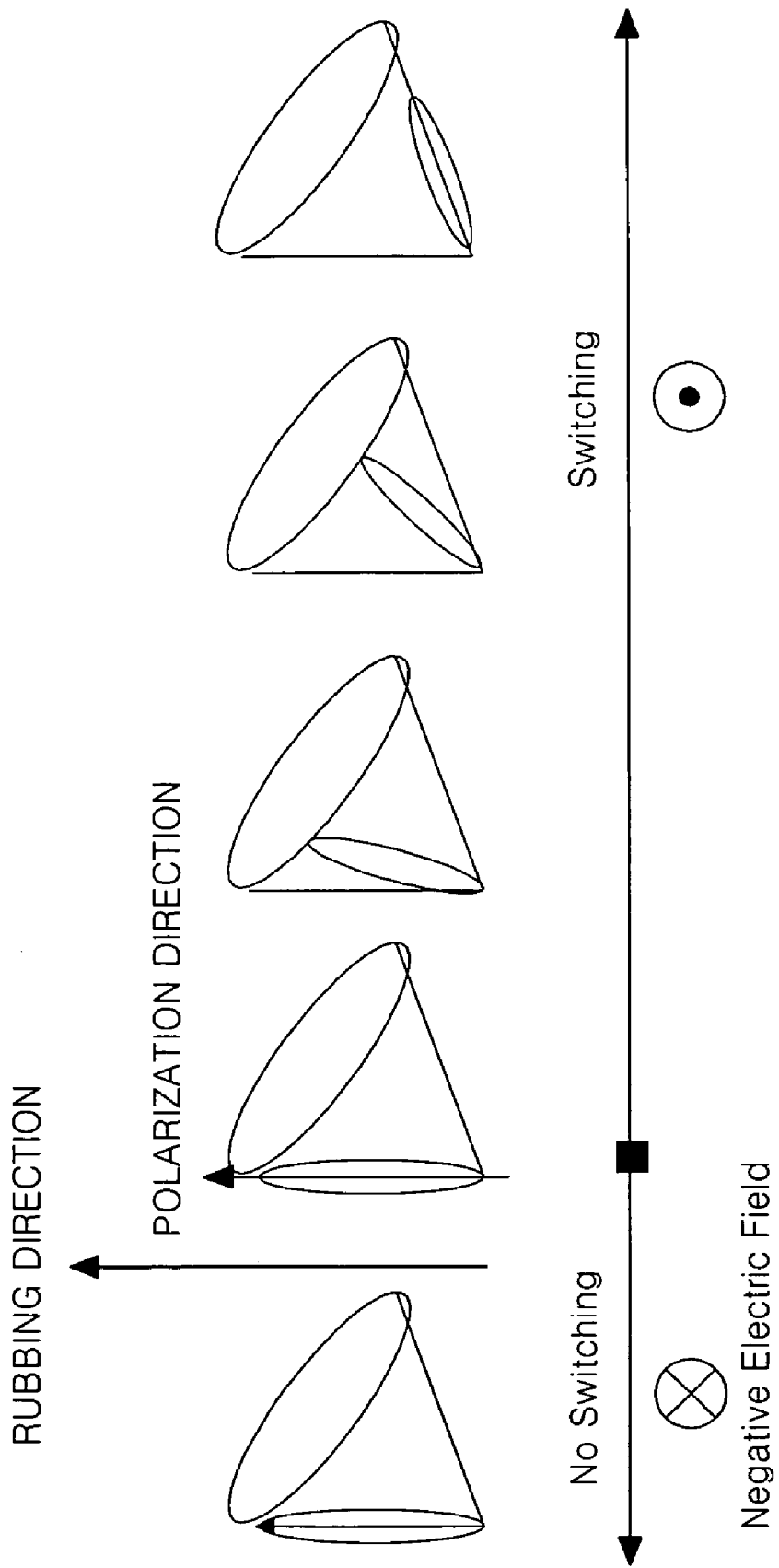
FIG. 8 is a configuration illustrating a liquid crystal molecule reacting by an exterior electric field in two sub-regions shown in FIG. 7 according to the related art.

The ferroelectric liquid crystal layers 24 and 34, uniformly aligned to the mono-stable state through the processes as in FIGS. 9A to 9D and FIGS. 11A to 11D, are operated in the half V-switching mode shown in FIG. 5A or 5B. The liquid crystal display device of the in-plane switching mode implemented by using the ferroelectric liquid crystal of the half V-switching mode and the method of fabricating the same will be described in conjunction with FIGS. 13 and 14. The upper plate of the liquid crystal display device of the in-plane switching mode according to the present invention is manufactured by the method as in FIGS. 9A to 9D, and the lower plate is manufactured by the method as in FIGS. 11A to 11D.

FIG. 13 is a cross-sectional view illustrating a liquid crystal display device of an in-plane switching mode according to an exemplary embodiment of the present invention. Referring to FIG. 13, the exemplary liquid crystal display device of the in-plane switching mode according to the present invention includes an upper plate 100 and a lower plate 110 combined by a sealant (not shown), and a nematic liquid crystal 50 injected between the upper plate 100 and the lower plate 110. The ferroelectric liquid crystal layers 24 and 34 respectively formed in the upper glass substrate 21 of the upper plate 100 and the lower glass substrate 31 of the lower plate 110 forms an interface with the nematic liquid crystal. Polarizers (not shown) whose light transmitting axes are vertically crossed with each other are attached on a light incident surface of the lower glass substrate 31 and on a light outgoing surface of the upper glass substrate 21, respectively.

In liquid crystal display device according to the present invention, a voltage is applied to the upper electrode 22 and the lower electrode 32 to drive the nematic liquid crystal 50 under in-plane, to thereby modulate light. At this time, when applying an electric field (E) having a polarity different from the polarity having been aligned during the transition process to the chiral smectic C phase (Sm C*), the ferroelectric liquid crystal 40 is driven in a direction of the in-plane as the direction of the spontaneous polarization Ps is changed, and induces the namatic liquid crystal molecules 50 adjacent to the ferroelectric liquid crystal 40 to drive under in-plane.

The liquid crystal display device of the in-plane switching mode assures that a wide viewing angle is implemented by virtue of the in-plane driving of the nematic liquid crystal 50 and that a deterioration of an aperture ratio is minimized by applying an electric field to the liquid crystal 50 under a vertical electric field scheme. Further, since the nematic liquid crystal 50 is rapidly moved by the ferroelectric liquid crystal 40, it is possible to improve a response speed of the nematic liquid crystal 50.

Figure 15:
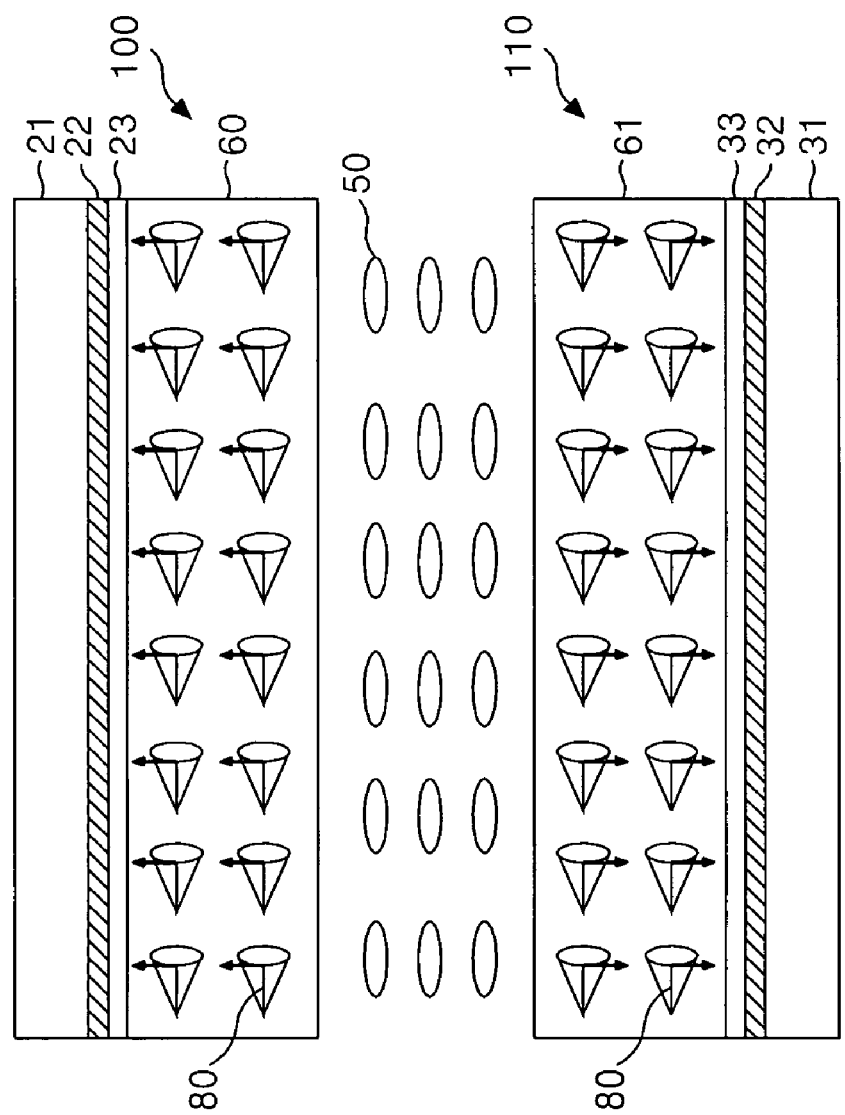
FIGS. 15 and 16 are sectional views illustrating a liquid crystal display device of an in-plane switching mode according to additional embodiments of the present invention.
Figure 16:
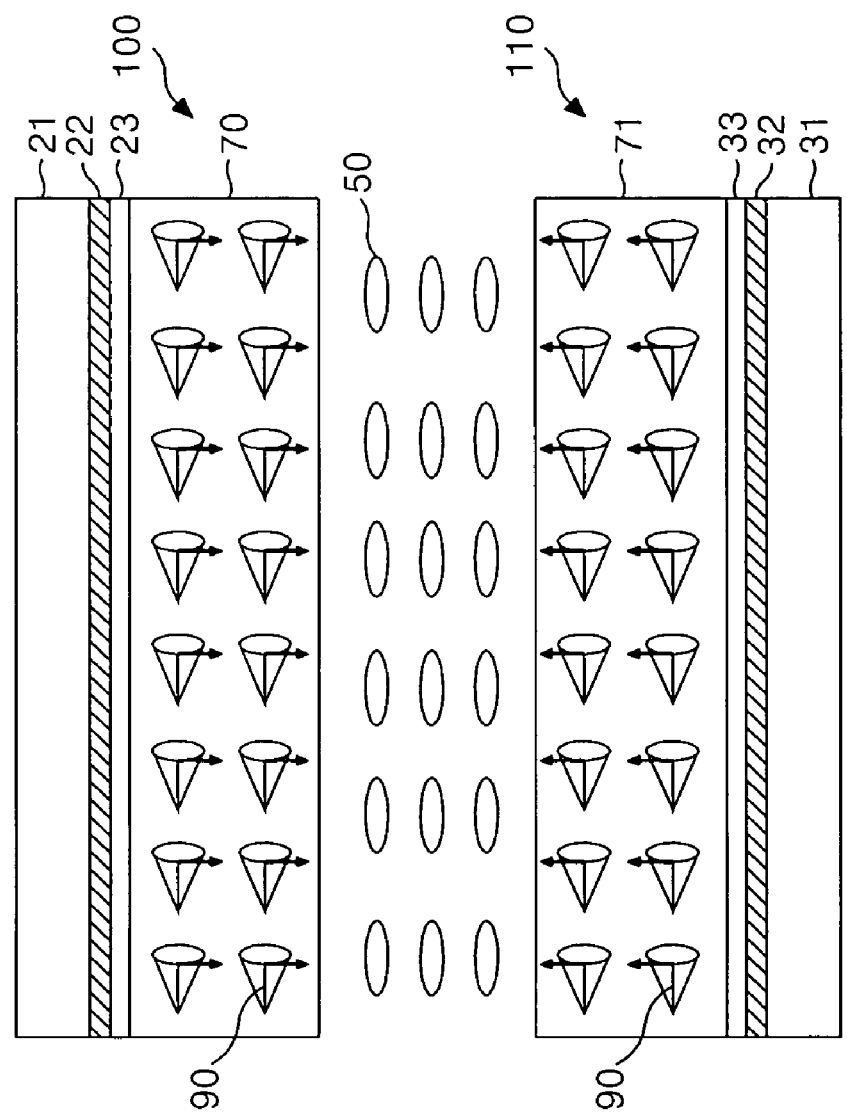

FIGS. 15 and 16 are cross-sectional views illustrating a liquid crystal display device of an in-plane switching mode according to further another embodiment of the present invention. Referring to FIGS. 15 and 16, in the liquid crystal display device of the in-plane switching mode according to the present invention, directions of spontaneous polarizations Ps of ferroelectric liquid crystals 80 and 90 in ferroelectric liquid crystal layers 60, 61; and 70, 71 formed on the upper plate 110 and the lower plate 100 are made differently from each other.

The liquid crystal display device shown in FIG. 13 reacts to only an electric field with any one of polarities in accordance with a half V-switching mode to drive the nematic liquid crystal 50 under the in-plane switching since the spontaneous polarization directions of the ferroelectric liquid crystals on the upper plate 100 and the lower plate 110 are same with each other.

In contrast, if the spontaneous polarization directions of the ferroelectric liquid crystal on the upper plate 100 and the lower plate 110 are made differently from each other, then the ferroelectric liquid crystal 80 or 90 formed on any one of the upper and the lower glass substrates 21 and 31 derives the driving of the nematic liquid crystal under the in-plane switching when an electric field with a positive polarity or a negative polarity is applied, and simultaneously, the ferroelectric liquid crystal 80 or 90 formed on the other substrate 21 or 31 do not react to the electric field and maintain an incipient arrangement state as it is. At this time, as the nematic liquid crystal 50 is switched in plane only by the ferroelectric liquid crystal resided in one hand, the nematic liquid crystal 50 becomes a structure twisted in a vertical direction. As a result, the liquid crystal display device of the in-plane switching mode in FIGS. 15 and 16 reacts to both electric fields with the positive polarity and the negative polarity and thus, is capable of displaying images under the in-plane switching of the nematic liquid crystal 50.

In the liquid crystal display device in FIGS. 15 and 16, the direction of the spontaneous polarization of the ferroelectric liquid crystal may be arranged in a desired direction, through the methods illustrated in FIGS. 9A to 9D and FIGS. 11A to 11D. As described above, the ferroelectric liquid crystal is transited from the isotropic phase to the smectic phase while the ferroelectric liquid crystal 31 is exposed to a medium having an electric polarity. Therefore, it is possible to uniformly arrange the spontaneous polarization of the liquid crystal material without having the exterior electric field as well as to implement the wide viewing angle by using the in-plane driving of the ferroelectric liquid crystal.

It will be apparent to those skilled in the art that various modifications and variations can be made in the in plane switching mode liquid crystal display device and method of fabricating the same the present invention without departing from the spirit or scope of the invention. Thus, it is intended that the present invention cover the modifications and variations of this invention provided they come within the scope of the appended claims and their equivalents.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    a first substrate;
    a second substrate;
    ferroelectric liquid crystal layers between the first and second substrates disposed substantially at respective surfaces of the first and second substrates, the ferroelectric liquid crystal layers arranged by an exposure to one of an amphiphobic medium and an amphiphilic medium;
    a nematic liquid crystal layer between the ferroelectric liquid crystal layer of the first substrate and the ferroelectric liquid crystal layer of the second substrate; and
    electrodes disposed on surfaces of each of the first and second substrates to vertically apply an electric field to the ferroelectric liquid crystal layers and to the nematic liquid crystal layer.

2. The in-plane switching mode liquid crystal display device according to claim 1, wherein the ferroelectric liquid crystal layer includes a phase transition from an isotropic phase to a chiral smectic C phase.

3. The in-plane switching mode liquid crystal display device according to claim 2, wherein the phase transition includes a chiral smectic A phase between the isotropic phase to the chiral smectic C phase.

4. The in-plane switching mode liquid crystal display device according to claim 2, wherein the phase transition includes a chiral nematic phase between the isotropic phase to the chiral smectic C phase.

5. The in-plane switching mode liquid crystal display device according to claim 1, wherein surfaces of each of the first and second substrates include an alignment film.

6. The in-plane switching mode liquid crystal display device according to claim 5, wherein the alignment film includes one of an amphiphilic medium and an amphiphobic medium.

7. The in-plane switching mode liquid crystal display device according to claim 5, wherein a spontaneous polarization of the ferroelectric liquid crystal layer of the second substrate is directed toward the alignment film.

8. The in-plane switching mode liquid crystal display device according to claim 5, wherein a spontaneous polarization of the ferroelectric liquid crystal layer of the first substrate is directed toward the opposite side of the alignment film.

9. The in-plane switching mode liquid crystal display device according to claim 1, wherein a direction of the spontaneous polarization of the ferroelectric liquid crystal layer of the first substrate is different from a direction of the spontaneous polarization of the ferroelectric liquid crystal layer of the second substrate.

10. The in-plane switching mode liquid crystal display device according to claim 1, wherein a direction of the spontaneous polarization of the ferroelectric liquid crystal layer of the first substrate is same as a direction of the spontaneous polarization of the ferroelectric liquid crystal layer of the second substrate.

11. The in-plane switching mode liquid crystal display device according to claim 1, wherein the ferroelectric liquid crystal layer is arranged in a mono-stable state on the first and second substrates.

12. A method of fabricating an in-plane switching mode liquid crystal display device, comprising:
   forming an electrode on each of first and second substrates;
   forming ferroelectric liquid crystal layers at respective surfaces of the first and second substrates;
   deriving a phase transition of the ferroelectric liquid crystal layers in a state exposed to one of an amphiphilic medium and an amphiphobic medium to stabilize the ferroelectric liquid crystal layers; and
   forming a nematic liquid crystal layer between the ferroelectric liquid crystal layer of the first substrate and the ferroelectric liquid crystal layer of the second substrate.

13. The method according to claim 12, wherein surfaces of each of the first and second substrates include an alignment film.

14. The method according to claim 13, wherein the alignment film includes the amphiphilic medium.

15. The method according to claim 14, wherein the alignment film includes one of polyamic acid and polyimide.

16. The method according to claim 12, wherein at least one of the ferroelectric liquid crystal layers is exposed to a medium having a weaker polarity than the alignment film so that a spontaneous polarization is directed toward the alignment film.

17. The method according to claim 16, wherein the medium includes one of air and nitrogen.

18. The method according to claim 12, wherein at least one of the ferroelectric liquid crystal layers is exposed to a medium having a stronger polarity than the alignment film so that a spontaneous polarization is directed toward an opposite side of the alignment film.

19. The method according to claim 18, wherein the medium includes one of oxygen and water.

20. The method according to claim 12, wherein the ferroelectric liquid crystal layer is arranged in a mono-stable state on the first and second substrates.

21. The method according to claim 12, wherein the ferroelectric liquid crystal layers include the phase transition from an isotropic phase to a chiral smectic C phase.

22. The method according to claim 12, wherein the phase transition of the ferroelectric liquid crystal layers includes a first phase transition from a random phase to an isotropic phase, a second phase transition from the isotropic phase to a chiral nematic phase and a third phase transition from the chiral nematic phase to a chiral smectic C phase.

23. The method according to claim 22, wherein the first phase transition is performed by applying a mixture of the ferroelectric liquid crystal layer and an organic solvent onto the first and second substrates, and heating up the first and second substrates to a temperature between about 140° C. and 160° C.

24. The method according to claim 22, wherein the second phase transition is performed by cooling down the first and second substrates to a temperature between about 110° C. and 85° C.

25. The method according to claim 22, wherein the third phase transition is performed by cooling down the first and second substrates to a temperature between about 80° C. and 50° C.

26. The method according to claim 12, wherein the phase transition of the ferroelectric liquid crystal layers includes a first phase transition from an isotropic phase to a chiral smectic A phase and a second phase transition from the chiral smectic A phase to a chiral smectic C phase.

* * * * *